United States Patent
Iwaki

[15] 3,663,946
[45] May 16, 1972

[54] GENERATOR ARRANGEMENT WITH REGULATED OUTPUT

[72] Inventor: Katsutaro Iwaki, Aichi Ken, Japan
[73] Assignee: Nippon Denso Kabushiki Kaisha, Aichi Ken, Japan
[22] Filed: Nov. 13, 1970
[21] Appl. No.: 89,353

[30] Foreign Application Priority Data
Nov. 14, 1969 Japan..............................44/108800

[52] U.S. Cl...................................322/23, 322/25, 322/27, 322/28, 322/33, 322/73
[51] Int. Cl. .............................................H02p 9/30
[58] Field of Search...................322/23, 24, 25, 27, 28, 33, 322/36, 73

[56] References Cited
UNITED STATES PATENTS 3,059,167 10/1962 Byles........................................322/25
3,069,616 12/1962 Curtis.......................................322/25
3,296,516 1/1967 Paine et al. ...........................322/25 X Primary Examiner—Lewis H. Myers
Assistant Examiner—H. Huberfeld
Attorney—Michael S. Striker

[57] ABSTRACT

Connected to a DC generator is a regulating circuit having a first transistor in series with the generator field winding and rendered non-conductive whenever the voltage output of a generator reaches a predetermined maximum or the generator output current reaches a maximum that increases in value as the ambient temperature falls. A differential amplifier is connected to a positive temperature coefficient resistor, carrying at least part of a load current, to furnish differential voltage of increasing value as the voltage drop across the positive temperature coefficient resistor increases, for rendering the first transistor non-conductive when this difference voltage reaches a sufficient value. A second transistor is turned on when the generator output voltage reaches a predetermined value, thereby turning off the first transistor.

15 Claims, 3 Drawing Figures

Patented May 16, 1972 3,663,946

INVENTOR
Katsutaro IWAKI
BY
his ATTORNEY

GENERATOR ARRANGEMENT WITH REGULATED OUTPUT

BACKGROUND OF THE INVENTION

The invention relates to a generator arrangement having a generator driven at greatly varying speeds, and further including a regulating circuit for regulating the output of the generator.

SUMMARY OF THE INVENTION

An object of the invention is a generator arrangement having a generator, such as a DC generator, and a regulating circuit for holding the generator voltage output to a constant value and for limiting the current drawn from the generator to a safe value.

Another object of the invention is a generator arrangement of the previous object, the regulating circuit of which is particularly suited to being constructed as an integrated circuit.

The invention essentially consists of a generator having a field winding and an output and driven at greatly varying speeds, a regulating direct current electric circuit connected to receive the electrical output of the generator, the circuit including a semi-conductor element controllable between conductive and non-conductive states and connected in series with the field winding, and the control means connected to the semi-conductor element for rendering the semi-conductor element non-conductive and thereby interrupting the current flow through the field winding when either the generator output voltage reaches a predetermined maximum or the generator output current reaches a maximum the value of which is greater as the ambient temperature is lower.

In accordance with the invention, the semi-conductor element is advantageously a first transistor, and the control means also includes a second transistor connected to the first transistor.

The regulating circuit has a high degree of temperature stability if the voltage drop of a positive temperature coefficient resistor is fed to a differential amplifier instead of to a conventional amplifier. The differential amplifier cooperates with a Zener diode.

The precision and reliability of the regulating circuit are improved by an exact control of the conductivity of the second transistor. The conductivity of this transistor is advantageously controlled by a Zener diode connected to the base of the transistor. The reliability of the circuit is still further improved if this Zener diode is replaced by a transistor, the conductivity of which is controlled by a Zener diode.

When the circuit is constructed as an integrated circuit, a diode is advantageously connected to prevent the flow of a reverse current from the battery.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
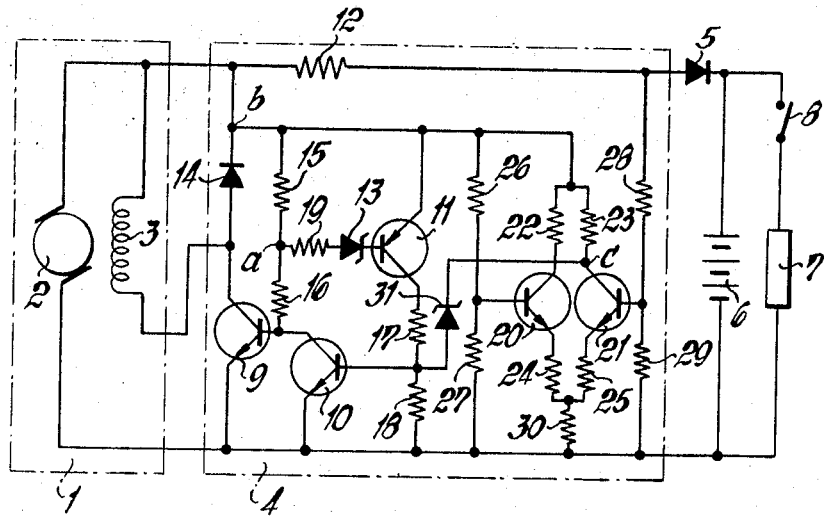
FIG. 1 is a circuit diagram of one embodiment of the invention.

With reference to the first embodiment, shown in FIG. 1, a DC generator, having an armature 2 and a field winding 3, is denoted by the box 1, and the circuit for regulating the output of the generator 1 is denoted by the box 4. The diode 5 is connected to prevent discharge of the battery 6 through the regulating circuit 4. The battery 6, which in the present instance is the battery of the motor vehicle, is connected to the load 7 of the vehicle through an operating switch 8. The schematically shown vehicle load represents the head lamps and other electrical equipment.

The regulating circuit 4 consists essentially of a current circuit having two similar transistors 9 and 10, a control transistor 11 for controlling the transistors 9 and 10, a resistor 12 having a high positive temperature coefficient, and a Zener diode 13. The collector of transistor 9 is connected by shunt circuit, consisting of the field winding 3 and of a diode 14, to one terminal of the positive temperature coefficient resistor 12; and the emitter of this transistor is connected to the emitter of the transistor 10, which forms the first stage of the combination comprised by the transistors 9 and 10. The diode 14 protects against reverse voltage. The base of the transistor 9 is connected by two base resistors 15 and 16 to the same terminal of the positive temperature coefficient resistor 12 as is the cathode of the diode 14. These resistors 15 and 16 constitute a voltage divider.

A resistor 17 connects the base of the transistor 10 to the collector of the control transistor 11. A resistor 18 is connected between the base and the emitter of the transistor 10. A Zener diode 13 and a resistor 19 connect the base of the control transistor 11 to the junction $a$ between the base resistors 15 and 16. The emitter of the control transistor is connected to the junction $b$ common to one end of the armature 2, the field winding 3, the base resistor 15, the positive temperature coefficient resistor 12, and to the cathode of the protective diode 14.

Resistors 22 and 23 connect together the respective collectors, and resistors 24 and 25 connect together the respective emitters, of two transistors 20 and 21, the bases of these two transistors being connected to the junction of respective voltage dividers 26, 27 and 28, 29. A resistor 30 connects the junction between the resistors 24 and 25 to the negative line. The junction $c$ of the collector of transistor 21 is connected by a Zener diode 31 to the base of transistor 10. The positive temperature coefficient resistor 12, the transistors 20 and 21, and the resistors 22 through 30 constitute a differential amplifier.

The regulating circuit just described operates in the following manner. As soon as the DC generator 1 turns, the residual magnetism produces a voltage that causes a current to flow through the positive temperature coefficient resistor 12 and through he base resistors 15 and 16 to the base of transistor 9, tuning on the latter and causing a field current to flow. Consequently, the generator is self-excited.

So long as the Zener voltage of the Zener diode 13 is not reached, no base current flows in the transistor 11 and the latter, therefore, remains turned off. Moreover, until the Zener voltage of the Zener diode 31 is reached, the latter also remains non-conductive, so that no base current can flow in the transistor 10; and the latter remains turned off.

As the rpm of the generator 1 increases, the generator output voltage rises until a predetermined value is reached. As a consequence of the greater and greater voltage drop across the resistor 15, caused by the increasing amount of current flowing through this resistor, the potential difference between the junctions $a$ and $b$ exceeds the Zener voltage of the Zener diode 13, causing the latter and therefore the control transistor 11 to become conductive. The base current flowing in the control transistor 11 turns on the transistor 10. The transistor 9 is turned off, because its base emitter path is short-circuited by the transistor 10; and the current through the field winding 3 is interrupted.

The constant repetition of this operation ensures that the voltage delivered by the generator 1 to the battery 6 and to the load 7 is always held at a constant value. The battery 6 is charged at a constant voltage.

If the load demand is small, the current flowing through, and the voltage drop across, the positive temperature coefficient resistor 12 are also small, and the transistors 20 and 21 of the differential amplifier are balanced. The Zener diode 31 does not conduct. As the load current increases, the voltage drop across the positive temperature coefficient resistor 12 becomes greater and greater, the transistors 20 and 21 becoming unbalanced, because the collector current of transistor 21 falls. The potential at the junction c rises and as soon as it is higher than the Zener voltage of the Zener diode 31, the latter and the transistor 10 are conductive. The transistor 9 is turned off, and the current through the field winding 3 is interrupted independent of the value of the voltage across the generator output. The repetition of the operation just described regulates the output current of the generator 1.

The differential amplifier in conjunction with the positive temperature coefficient resistor 12 ensure an excellent temperature compensation for the regulating circuit 4. An increase in the current through the transistor 21, caused by a rise in temperature, is compensated for by a simultaneous rise in the current through the transistor 20 and by the rising voltage drop across the resistor 30 caused by the increased current through the transistors 20 and 21.

Figure 3:
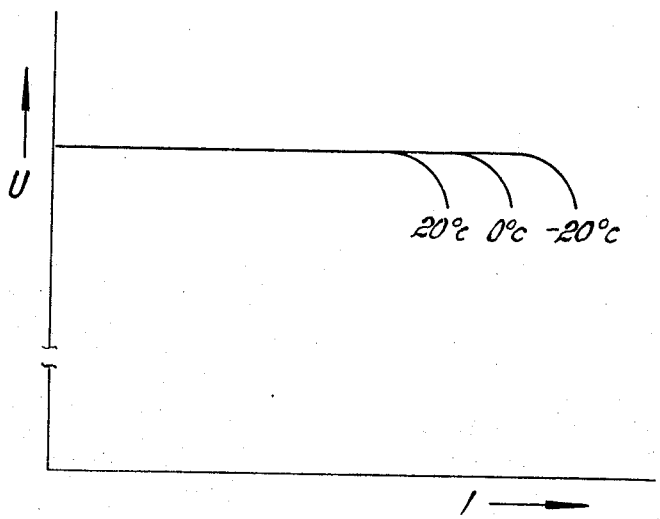
FIG. 3 is a graph showing the variation in output current of the generator with change in ambient temperature.

The resistor 12, which has a high positive temperature coefficient, acts, in conjunction with the differential amplifier, as a current limiter. The temperature of this resistor, which rises with increasing temperature, causes an appreciable increase in the resistance of the resistor. The resistance of the resistor 12 is also, of course, dependent on the ambient temperature. With reference to FIG. 3, the voltage U and the current I are respectively plotted along the ordinate and the abscissa.

The graph of FIG. 3 shows that as the ambient temperature falls the peak allowable current rises. The advantageous result of this is that in winter, when the maximum permissible operating temperature of a generator is not reached, an appreciably greater maximum output current is available than in summer. In view of the usually greater electrical load in winder, this is a highly desirable characteristic of the invention.

Figure 2:
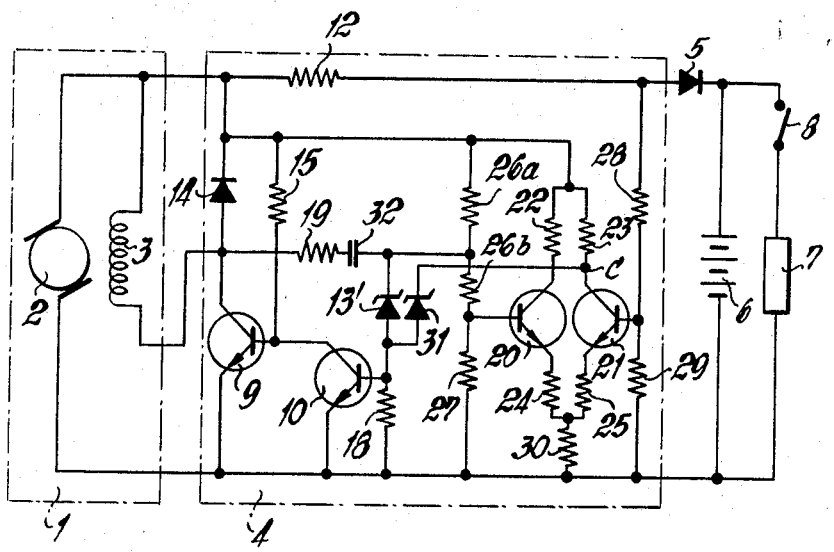
FIG. 2 is a circuit diagram of a second embodiment of the invention.

FIG. 2 shows a second embodiment of the invention, which differs from that shown in FIG. 1 in that a Zener 13' replaces the control resistor 11 and the Zener diode 13. The cathode of the Zener diode 13' is connected to the junction between the resistors 26a and 26b, and the anode is connected to the base of the transistor 10. A capacitor 32 is connected between the resistor 19 and the cathode of the Zener diode 13'. This embodiment of the invention regulates the output voltage and current of the generator 1 in the same way as does the first embodiment.

In the two embodiments of the invention, the positive temperature coefficient resistor 12 constitutes a part of the current circuit of the differential amplifier, which controls the transistor 10 through a constant voltage component 31, which in the two embodiments described is a Zener diode. As a consequence of this arrangement, the output voltage and current of the generator 1 are regulated by the resistor 12 having a small resistance. Both the electrical losses of, and the heat generated by, this resistor are small, so that the other components, the resistors and the semiconductors, which are small in size, together with the resistor 12, are easily assembled as a unit in the form of an integrated circuit.

The regulating circuits of the invention are not limited to use with a DC generator. The DC generator can be replaced by an AC generator having a rectifying circuit. The operation of applicant's invention with an AC generator is fundamentally the same, and therefore does not require further explanation.

It will be understood that each of the elements described above, or two or more together, may also find a useful application in other types of circuits differing from the types described above.

While the invention has been illustrated and described as embodied in a generator arrangement with regulated output, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A generator arrangement comprising, in combination, a generator having a field winding and an output and driven at greatly varying speeds; a regulating direct current electric circuit connected to receive the electric output of said generator, said circuit including a semiconductor element controllable between conductive and non-conductive states and connected in series with said field winding, load means and a positive temperature coefficient resistor connected to one side of said load means for conducting at least part of the load current thereof; and control means including amplifier means connected to said positive temperature coefficient resistor for interrupting the current through said field winding in dependence on the voltage drop across said positive temperature coefficient resistor, said control means connected to said semiconductor element for rendering said semiconductor element non-conductive and thereby interrupting the current flow through said field winding when either the generator output voltage reaches a predetermined maximum or independently thereof, the generator output current reaches a maximum value which is greater as the ambient temperature is lower, said control means controlling said semiconductor element so that said generator output voltage is substantially constant for varying magnitudes of said output current.

2. A generator arrangement as defined in claim 1, wherein said amplifier means is a differential amplifier for delivering a difference voltage that turns off said semi-conductor element when the voltage drop across said positive temperature coefficient resistor is sufficiently large.

3. A generator arrangement as defined in claim 2, wherein said control means has conductive and non-conductive states, and when respectively conductive and non-conductive said semi-conductor element is respectively non-conductive and conductive.

4. A generator arrangement as defined in claim 3, wherein said semi-conductor element is a first transistor.

5. A generator arrangement as defined in claim 4, wherein said control means includes a second transistor.

6. A generator arrangement comprising, in combination, a generator having a field winding and an output and driven at greatly varying speeds; a regulating direct current electric circuit connected to receive the electric output of said generator, said circuit including a semiconductor element controllable between conductive and non-conductive states and connected in series with said field winding, and control means connected to said semiconductor element for rendering said semiconductor element non-conductive and thereby interrupting the current flow through said field winding when either the generator output voltage reaches a predetermined maximum or the generator output current reaches a maximum value which is greater as the ambient temperature is lower; load means in said regulating circuit; a positive temperature coefficient resistor connected to one side of said load means for conducting at least part of the load current thereof; amplifier means included in said control means and connected to said positive temperature coefficient resistor or interrupting the current through said field winding in dependence on the voltage drop across said positive temperature coefficient resistor, said amplifier means being a differential amplifier for delivering a difference voltage that turns off said semiconductor element when the voltage drop across said positive temperature coefficient resistor is sufficiently large, said control means having conductive and non-conductive states and when respectively conductive and non-conductive said semiconductor element is respectively non-conductive and conductive, said semiconductor element being a first transistor; a second transistor in said control means, said differential amplifier comprising: two transistors, and including a firs zener diode of which the cathode is connected to the collector of that transistor of the differential amplifier furnishing said difference voltage and the anode is connected to the base of said second transistor.

7. A generator arrangement as defined in claim 6, said regulating circuit further including voltage divider means connected across the electrical output of said generator, and a second Zener diode of which the cathode is connected to an intermediate tap of said voltage divider means and the anode is connected to the base of said second transistor.

8. A generator arrangement as defined in claim 6, wherein said control means includes a third transistor for switching said second transistor between said conductive and non-conductive states, and said regulating circuit includes a second Zener diode so connected in said regulating circuit and to the base of said third transistor that the latter is rendered conductive when the output voltage of said generator increases to said predetermined maximum.

9. A generator arrangement as defined in claim 8, said regulating circuit further including voltage divider means connected between the base of said first transistor and one side of the electrical output of said generator, and wherein the anode of said second Zener diode is connected to an intermediate tap of said voltage divider means and the cathode is connected to the base of said third transistor.

10. A generator arrangement as defined in claim 9, including a resistor connected between said intermediate path and the anode of said second Zener diode.

11. A generator arrangement as defined in claim 6, wherein said positive temperature coefficient resistor is connected between said one side of said load means and one side of like polarity of the electrical output of said generator.

12. A generator arrangement as defined in claim 11, said regulating circuit further including first and second voltage divider means connected across the electrical output of said generator and to the more electrically positive end of said positive temperature coefficient resistor, and wherein the bases of said two transistors of the differential amplifier are connected to intermediate taps of respective ones of said first and second voltage divider means.

13. A generator arrangement as defined in claim 11, said regulating circuit further including a first voltage divider means connected across the electrical output of said generator and to the more electrically positive end of said positive temperature coefficient resistor and second voltage divider means connected across the electrical output of said generator and to the more electrically negative end of said positive temperature coefficient resistor, the bases of said two transistors of the differential amplifier being connected to intermediate taps of respective ones of said first and second voltage divider means.

14. A generator arrangement as defined in claim 11, wherein said generator is the battery charging generator of a motor vehicle, and including a battery connected across said load means, one pole of said battery being connected to the more electrically negative end of said positive temperature coefficient resistor, and the other pole of said battery being connected to the other side of the electrical output of said generator.

15. A generator arrangement as defined in claim 14, including a diode connected to prevent discharge of said battery through said regulating circuit.

* * * * *